Jan. 6, 1959  E. A. STALKER  2,867,407
AXIAL FLOW ROTOR CONSTRUCTION OF JOINED PARTS
Filed Oct. 1, 1952  2 Sheets-Sheet 1
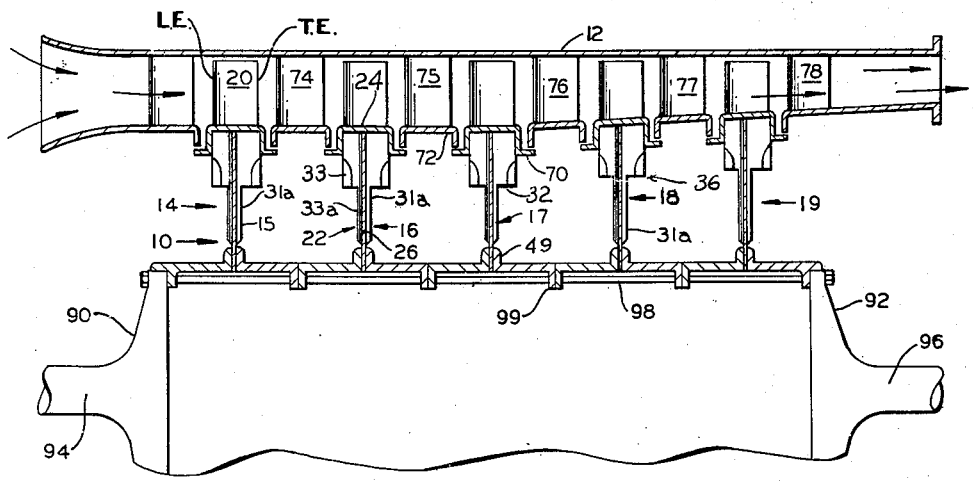
Fig.1
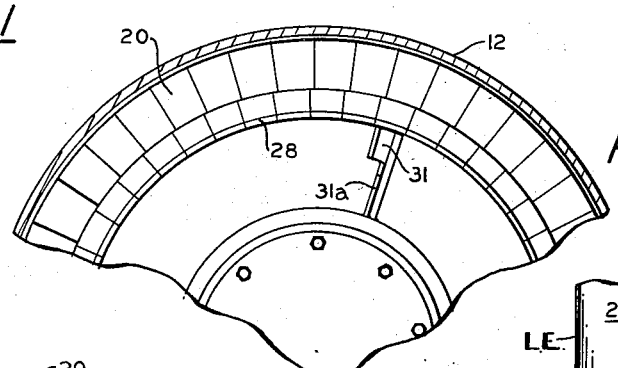
Fig.2
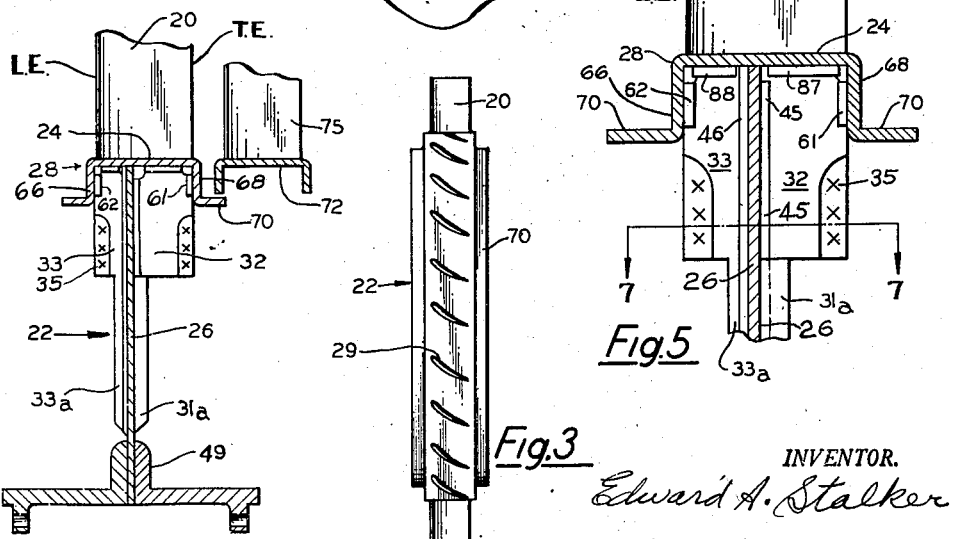
Fig.3
Fig.4
Fig.5
INVENTOR.
Edward A. Stalker Jan. 6, 1959  E. A. STALKER  2,867,407
AXIAL FLOW ROTOR CONSTRUCTION OF JOINED PARTS
Filed Oct. 1, 1952  2 Sheets-Sheet 2
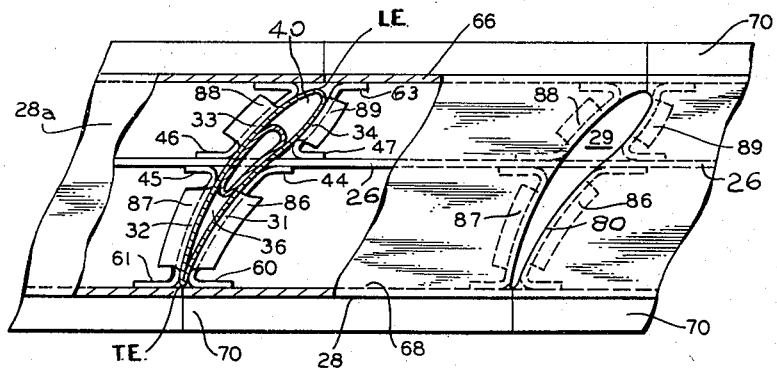
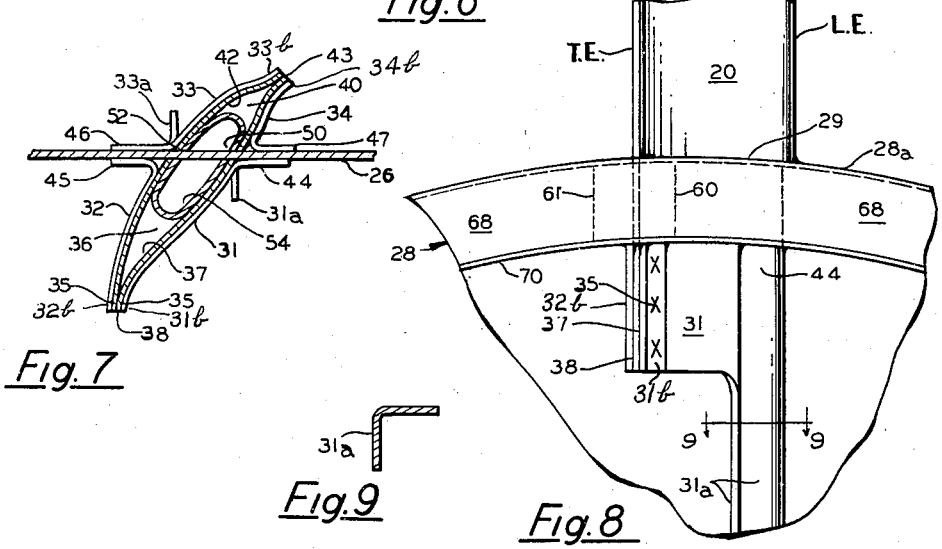
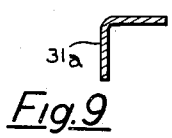
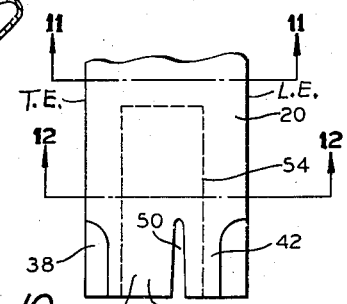
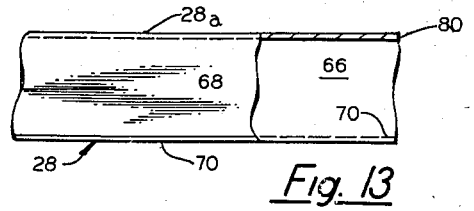
INVENTOR.
Edward A. Stalker

United States Patent Office 2,867,407
Patented Jan. 6, 1959

2,867,407

AXIAL FLOW ROTOR CONSTRUCTION OF JOINED PARTS

Edward A. Stalker, Bay City, Mich., assignor to The Stalker Development Company, Bay City, Mich., a corporation of Michigan Application October 1, 1952, Serial No. 312,457

13 Claims. (Cl. 253—39)

This invention relates to compressor rotors and particularly to the structure of the bladed wheels of which the rotor is comprised. In particular it relates to sheet metal fabrication of wheels by pressing and the like joined preferably by solders, for instance copper, silver and other strong solders.

An object of this invention is to provide a bladed wheel of sheet metal parts bonded together preferably by fused metal.

Another object is to provide positive means of joining the blades to the hub structure by fused metal.

Another object is to provide a structure bonded together by fused metal that can be readily inspected for soundness of the joints.

Still another object is to provide a sheet metal wheel with a single hub disk.

Other objects will appear from the specification, drawings, and claims.

The above objects are accomplished by the means illustrated in the accompanying drawings in which—

Fig. 1 is a fragmentary axial section through a multistage axial flow compressor according to the invention;

Fig. 2 is a fragmentary rear view of a wheel;

Fig. 3 is a side view of a wheel with only two blades in place;

Fig. 4 is an enlarged fragmentary axial section of a wheel;

Fig. 5 is an enlarged view of the rim and portion of the blade of Fig. 5;

Fig. 6 is a radial view of a fragment of a wheel showing one blade in section just above the rim surface and a rim opening to receive a blade;

Fig. 7 is a section on line 7—7 in Fig. 5;

Fig. 8 is an axial view of a fragment of a wheel;

Fig. 9 is a section of a rib on line 9—9 in Fig. 8;

Fig. 10 is a fragmentary side view of a blade;

Fig. 11 is a section on line 11—11 in Fig. 10;

Fig. 12 is a section on line 12—12 in Fig. 10; and

Fig. 13 is an axial view of a rim segment.

A compressor changes the density of the fluid flowing through it and in an axial flow machine this change is accomplished by adding velocity to the fluid and then slowing it down by diffusion. That is the fluid is given sufficient whirl speed, so that when it is slowed down there is a significant change in density. Tip speeds of the blades are considered a criterion of whether a machine is a compressor or a simple fan. Compressors are considered to operate in the range above 400 feet per second, since not until this speed is reached with air is there a change in density significant for engineering purposes. At this speed the average density change is about 3% which is just above the accuracy of common experimental measurements in industry.

When tip speeds exceed 400 F. P. S. the structural problems become very difficult and increase in severity as the tip speed approaches the velocity of sound or even exceeds it for some compressors.

At these high speeds new problems arise. It becomes difficult to provide blade attachments which are economical and strong. It also becomes difficult to provide rim segments which can sustain the high centrifugal loads without deformation and failure.

Successful high speed compressor rotors have employed solid blades which had heavy blade bases. These bases are fitted into a heavy hub rim which is suitably grooved to receive them. The heavy blades require heavy blade bases and these in turn require heavy hub rims. In addition the slotting of the rims to receive the blade bases destroys the peripheral continuity of the rim (to resist peripheral stresses) leaving segments between blades which not only do not aid the hub in carrying its load but actually adds to the centrifugal load on the hub, since as just remarked, the slots preclude the use of these segments in carrying the peripheral stresses.

In the present invention the blades are made hollow of light sheet metal construction. Blade bases are not required and the centrifugal loads of the blades are carried directly to the central plate or disk as the main structure for resisting the centrifugal loads. The rim is essentially a closure and at its ends is supported on the blades.

Thus by making the blades of limited weight, the centrifugal load of the blades is greatly reduced. Since this load is small and limited and because the blade bases are eliminated and because there is no heavy rim needed to accommodate blade bases, the hub disk can be of limited thickness and weight adapted to sheet metal construction.

The various parts of each wheel are soldered together. Since the failure of any one part such as a blade, may cause the part to pass through the machine and destroy the other blades, it is imperative that all joints be good ones. A method of visually inspecting all joints is therefore highly desirable to assure that each machine is structurally sound.

In axial flow wheels the blades have their leading edges (L. E.) and trailing edges (T. E.) extending radially. The inlets and exits of the passages are at about similar distances from the axis of rotation. The axial lengths of the passages are of the same order of magnitude of the maximum blade length or substantially less. The wheel passages discharge their pumped fluid rearward along the axis of rotation.

Referring now to the drawings and particularly to Fig. 1, the compressor is indicated generally as 10 and is comprised of the case 12 and the rotor 14. The latter is composed of the individual wheels 15—19. A typical wheel 16, as shown in the Figs. 1–11 has the hollow blades 20 spaced peripherally about the rim 24 of a hub structure 22.

The hub or hub structure comprises the central or wheel disk 26 and the rim means 24 comprising rim segments 28 positioned between the blades. The adjacent segments define rim openings 29 therebetween contoured to a blade section.

The root end of each blade extends radially inward into and nests in a socket means defined by the socket elements 31—34. The two elements 31 and 32 on one side of the disk 26 define a socket 36 which receives the rear portion 37 (Figs. 7, 8, and 10) of a blade root thereinto. The trailing edge portion 38 of each blade lies between the spaced rear edges of the elements 31 and 32. The spaced rear edges constitute axially directed radially extending flanges 31b and 32b. Thus these edges and the trailing edge portion of the blade may be fused together preferably by soldering. To hold the parts in relative position during soldering the parts may be spot welded as at 35, Figs. 4, 5, and 7.

The two elements 33 and 34 define the socket 40 which receives the front portion 42 of a blade root therein. See Figs. 6 and 7. This front portion has its walls pressed together at 43 to fit between the spaced edges of the elements 33 and 34, as shown particularly in Figs. 4, 5 and 7. These parts are fixed together by fused metal. The spaced front edges constitute axially directed radially extending flanges 32b and 34b.

The elements 31—34 have the flanges 44—47 faying the side surfaces of the disk 26 and fixed thereon preferably by solder and spot welds.

The socket element 31 on the rear side of the disk 26 has the rib extension 31a extending radially inward toward the hub ring 49. On the forward face of 26 the socket element 33 has a rib extension 33a likewise extending radially inward. See Figs. 1, and 4–8. Fig. 9 shows the angle cross section of these rib extensions.

Each blade has the slots 50 and 52 in opposite side walls adapting it to straddle the disk 26, Figs. 7 and 10.

Each blade has a stem 54 therein fused to the side walls of the blades to add stiffness and strength.

The socket elements 31—34 have respectively the flanges 60—63 fixed to the front and rear flanges, 66 and 68 respectively, of the rim means 24 as shown particularly in Figs. 4–6 and 8.

The rim segments 28 comprise the rim wall 28a and the front and rear flanges or walls 66 and 68 extending radially inward. These are preferably pressed integrally with the wall 28a. Each of these flanges has the axial flange 70 providing a seal in cooperation with the inner rings 72 of the stators 74—77.

In Fig. 13 there is shown a rear view of a rim segment 28. These segments are inserted radially between blades and fay the flanges 60—63 to which they are joined by spot welds and solder.

The end surfaces, such as 80, fit closely to the side surfaces of the blades and are fused to them by solder.

The rim wall 28a rests on the flanges 86—89 of the socket elements 31—34.

The rim means, wheel disk, and hub rings of each wheel are separately fabricated and joined preferably by solder.

The wheels are stacked axially between the end hubs 90 and 92 carrying the shafts 94 and 96. The wheels are held together by the tie-rods 98 passing through the projections 99.

All the parts such as the blades, the flanges of the sockets, and the rim segments are readily spot welded together to hold them in place while being soldered in a furnace. This makes a great savings in the cost of jigs and fixtures.

It will now be clear that each blade is positively held in the socket means 31—34 by fused metal along the leading and trailing edge portions of the root end of the blade and since the front and rear flanges have a limited radial length all the joints between the parts are easily inspected for soundness.

This invention refers to compressor rotors for elastic fluids. The bladed wheels making up such rotors have a substantial static pressure rise along the flow passages between blades from leading to trailing edges thereof. To provide for this pressure rise the passages must have closed peripheral surfaces extending between the blades and from the leading to the trailing edges thereof. At the radially inner ends of the passages the rim segments sustain the static pressure while at the outer ends the case performs this function.

Furthermore, since there is a substantial pressure rise from front to rear of the wheel the ratio of the hub radius to the blade tip radius (measured from the center of the shaft 94 to the rim surface 24) is relatively large of the order of 0.5 or more, preferably 0.6 or more, so that the pressure difference between front and rear can be sustained without a return flow at the hub. For a similar reason the blades are peripherally close together, preferably about one chord length or less apart.

When the blades are made hollow of thin sheet metal and thereby of limited weight the blade bases may be omitted and the rim structure can be of limited weight and thickness comparable to the blade wall thickness. The central disk can consequently be made of limited thickness and weight—and all these parts will be able to sustain their own centrifugal load and the centrifugal loads accumulated on them inward from the tips of the blades with sheet metal thicknesses of the order less than 0.003 times the wheel maximum or tip diameter. If the disk is made up of axial spaced sub-disks their total thickness can be of the order of the above values.

The sum of the thicknesses of the sheets comprising a blade wall should be about 0.002 times the maximum diameter of the wheel or less.

In the preferred form of this invention for a rotor of 36 inches maximum diameter the blades have sheet metal walls of a preferred thickness of about 0.010 inch. The internal stem and rim each has a preferred thickness of about 0.020 inch. The central disk has a preferred thickness of about 0.050.

In this application the term peripheral flange is used to refer to flanges directed substantially in the general peripheral direction. That is their side surfaces are substantially parallel to the plane of rotation with their bend line or base line extending in the general radial direction. Thus flanges 45 and 60, Figs. 6 and 8, are referred to as peripheral flanges. The term axially directed flanges is used to refer to flanges directed in the general axial direction from their base of support. These flanges may be radially or peripherally extending. Thus flanges 38 and 43, Figs. 7 and 10, are radially extending axial flanges; and flange 70 is a peripherally extending axial flange. The flanges 31b and 32b are radially extending axially directed flanges spaced apart peripherally to receive the flanges 38 therebetween.

The walls of the socket means are preferably sheet metal pressings or the like of a thickness of the order of the walls of the other parts such as the blades, disk, or rim means.

The blades are subject to both centrifugal loads and fluid-side loads as well as vibratory stresses. The wheel disk primarily carries centrifugal loads.

By making the blades hollow of sheet metal which permits the practical use of limited blade wall thickness each blade has a small or limited weight. The saving in weight in the blades reduces the load on the blade fastening and makes feasible the elimination of the blade base and the attachment of the blade directly to the central disk. That is the blade load is not carried in the rim and thence to the central disk. Rather the rim is carried on the blade structure to the central disk. Thus the rim can be of limited thickness and weight. These savings in weight in turn cumulatively reduce the stress on the central disk so that it can be made of such limited thickness that it can be a sheet metal structure.

With these progressive limitations in weight inward along the radii, the parts can be sheet metal pressings or stampings, reducing the weight by about 75% and the costs by a comparable amount.

While I have illustrated specific forms of the invention, it is to be understood that variations may be made therein and that I intend to claim my invention broadly as indicated by the appended claims.

I claim:

1. In combination in an elastic fluid axial flow compressor wheel, a sheet metal disk, a plurality of sheet metal socket means on said disk spaced peripherally thereabout adjacent the perimeter thereof, each said socket means having peripheral flanges faying the side surfaces of said disk and fixed thereto, each said socket means having axially directed flanges spaced apart peripherally, a plurality of sheet metal blades having root ends each nesting in a said socket means with a portion of said blade between said axially directed flanges, said portions being fixed to said flanges therebetween along a radial extent thereof, and sheet metal rim means extending peripherally about said disk and between adjacent said blades at the root ends thereof and from leading to trailing edges thereof to sustain a static pressure rise in said fluid flowing rearward between said blades, said rim means having front and rear flanges extending radially inward to a limited extent to provide for visual inspection of the joints between said blades and said socket means.

2. In combination in an elastic fluid axial flow compressor wheel, a sheet metal disk, a plurality of sheet metal socket means on said disk spaced peripherally thereabout adjacent the perimeter thereof, each said socket means having peripheral flanges faying opposite side surfaces of said disk and fixed thereto, each said socket means having a rib extending radially inward a substantial distance therefrom fixed to a side surface of said disk, each said socket means having peripherally directed flanges faying the side surfaces of said disk and fixed thereto, each said socket means having axially directed radially extending flanges spaced apart peripherally, a plurality of sheet metal blades having root ends each nesting in a said socket with a portion of said blade between said axially directed flanges, said portions being fixed to said flanges therebetween along a radial extent thereof, and sheet metal rim means extending peripherally about said disk and between adjacent said blades at the root ends thereof and from leading to trailing edges thereof to sustain a static pressure rise between said blades, said rim means having front and rear flanges extending radially inward to a limited extent to provide for visual inspection of the joints at said flanges.

3. In combination in an elastic fluid axial flow compressor wheel, a sheet metal disk, a plurality of sheet metal socket means on said disk spaced peripherally thereabout adjacent the perimeter thereof, each said socket means having peripheral flanges faying the side surfaces of said disk and fixed thereto, each said socket means having axially directed radially extending flanges spaced apart peripherally, a plurality of sheet metal blades having root ends each nesting in a said socket with a portion of said blade between said axially directed radially extending flanges, said portions being fixed to said flanges therebetween, and sheet metal rim means extending peripherally about said disk and between adjacent said blades at the root ends thereof and from leading to trailing edges thereof to sustain a static pressure rise in said fluid flowing rearward between said blades, said rim means having front and rear flanges extending radially inward to a limited extent to provide for visual inspection of the joints between said blades and said socket means, each said socket means also having peripheral flanges fixed to said front and rear flanges of said rim means.

4. In combination in an elastic fluid axial flow compressor wheel, a short metal disk, a plurality of socket means on said disk spaced peripherally thereabout adjacent the perimeter thereof, each said socket means being fixed by fused metal to opposite side surfaces of said disk, a radially directed rib extending from adjacent each socket means inward for a substantial radial distance and being fixed to a side surface of said disk, a plurality of blades having root ends each nesting in a said socket and fixed thereto, and sheet metal rim means extending peripherally about said disk and between adjacent said blades at the root ends thereof and from leading to trailing edges thereof to sustain a static pressure rise between said blades, said rim means being fixed by fused metal to each said socket means, said rim means having front and rear flanges extending radially inward to a limited extent to provide for visual inspection of the joints between said socket means, and disk.

5. In combination in an elastic fluid axial flow compressor wheel, a thin disk having a thickness less than 0.003 times the maximum diameter of said wheel, a plurality of socket means fixed on said disk spaced peripherally thereabout adjacent the perimeter thereof, each said socket means having axially directed radially extending flanges spaced apart peripherally, a plurality of blades having root ends each nesting in a said socket means with a flange portion of said blade between said axially directed flanges, said portions being fixed to said flanges therebetween, and rim means extending peripherally about said disk and between adjacent said blades at the root ends thereof and from leading to trailing edges thereof to sustain a static pressure rise in said fluid flowing rearward between said blades, said rim means having integrally pressed front and rear sheet metal flanges extending radially inward to a limited extent to provide for access to said socket means.

6. In combination in an elastic fluid axial flow high speed compressor wheel, a thin disk having a thickness adjacent the perimeter thereof less than about 0.003 times the wheel maximum diameter, a plurality of socket means fixed on said disk by fused metal and spaced peripherally thereabout adjacent the perimeter thereof, each said socket means having a radially facing opening to receive therethrough a radially inserted blade, a plurality of hollow blades having root ends each nested in a said socket means and being fixed thereto, each said blade at its root end having a spanwise extending slot therein receiving said disk thereinto, and sheet metal rim means extending peripherally about said disk and between adjacent said blades at the root ends thereof and from leading to trailing edges thereof to sustain an increase in density and a static pressure rise in said fluid flowing rearward between said blades, said rim means extending radially inward to a limited extent providing for access to said socket means and disk.

7. In combination in an elastic fluid axial flow compressor wheel, a sheet metal disk, a plurality of socket means on said disk spaced peripherally thereabout adjacent to the perimeter thereof, each said socket means having peripheral flanges faying the side surfaces of said disk and being fixed thereto defining joints therewith, each said socket having axially directed radially extending flanges spaced apart peripherally, a plurality of blades having root ends each nesting in a said socket means with a portion of said blade between said axially directed flanges, said portions being connected to said flanges, and a rim means extending peripherally about said disk and between adjacent said blades at the root ends thereof and from leading to trailing edges thereof to sustain a static pressure rise in said fluid flowing rearward between said blades, said rim means extending radially inward to a limited extent providing for visual inspection of said joints between said blades and said socket means.

8. In combination in an elastic fluid axial flow high speed wheel for exchanging energy with an elastic fluid, a separately fabricated disk having a thickness less than 0.003 times the maximum diameter of said wheel, a plurality of socket means on said disk spaced peripherally thereabout adjacent to the perimeter thereof, a separately fabricated hub means fixed on said disk for transmitting torque therebetween, each said socket means having axially directed radially extending flanges spaced apart peripherally, a plurality of blades having root ends each nesting in a said socket means with a portion of said blade between said axially directed flanges, said portions being connected to said flanges, and a separately fabricated rim means extending peripherally about said disk and between adjacent said blades at the root ends thereof and from leading to trailing edges thereof to sustain a static pressure rise in said fluid flowing rearward between said blades, said rim means extending radially inward to a limited extent providing for visual inspection of said joints between said blades and said socket means.

9. In combination in an elastic fluid axial flow compressor, a case, a wheel mounted in said case for rotation at high tip speed to impel a flow of elastic fluid therethrough with increased density and static pressure, said wheel comprising a separately fabricated disk having a thickness less than 0.003 times the maximum diameter of said wheel, a separately fabricated rim means including a rim surface of limited axial length and front and rear walls spaced apart axially and extending inward to a limited extent, said disk extending outward between said front and rear walls of said rim means, said rim means faying the side surfaces of said disk and being fixed thereto by fused metal, said rim means incorporating socket means each for receiving the inner end of a blade slid radially thereinto, and a plurality of axial flow blades, each having its inner end in a said socket and being supported by a surface thereof for retention therein, said rim means extending between blades and from front to rear of said wheel for sustaining said increased static pressure.

10. In combination in an axial flow machine for exchanging force with an elastic fluid, a case, a high speed wheel mounted in said case for rotation about an axis, said wheel comprising a central disk, a plurality of socket means fabricated separately from said disk and secured to the sides of said disk forming joints subject to centrifugal loads in shear, a plurality of axial flow blades carried on said disk for rotation at high speed developing a substantial change in density and pressure in said fluid, each said blade being secured in said socket means, and rim means of limited radical extent carried by said disk adjacent the root ends of said blades, said rim means extending from blade to blade and from front to rear of said wheel to sustain said change in pressure of said fluid flowing between said blades.

11. In combination in an axial flow machine for exchanging force with an elastic fluid, a case, a high speed wheel mounted in said case for rotation about an axis, said wheel comprising a disk, a plurality of socket means fabricated separately from said disk secured to the sides of said disk forming joints subject to centrifugal loads in shear, a plurality of axial flow blades carried on said disk for high rotational speed developing a substantial change in density and pressure in said fluid, each said blade being secured in said socket means, and rim means carried by said disk adjacent the root ends of said blades, said rim means extending from blade to blade and from front to rear of said wheel to sustain said change in pressure of said fluid flowing between said blades, said socket means having at least a portion thereof positioned inwardly of said rim means for accessibility.

12. In combination in an elastic fluid axial flow machine for exchanging force with an elastic fluid, a case, a high speed wheel mounted in said case for rotation about an axis, said wheel comprising a disk, a plurality of socket means separate from and fixed to the sides of said disk forming joints subject to centrifugal loads in shear, a plurality of axial flow blades carried on said disk for rotation at high speed developing a substantial change in density and pressure in said fluid, each said blade having the root end thereof secured in one of said socket means, each said socket means having a rib portion extending radially inwardly thereof and fixed to a side surface of said disk, and rim means carried in said wheel adjacent the root ends of said blades extending from blade to blade and from leading to trailing edges to sustain said increase in pressure of said fluid flowing between said blades.

13. In combination in an elastic fluid axial flow compressor for increasing the pressure of an elastic fluid, a case, a high speed wheel mounted in said case for rotation about an axis at blade tip speeds greater than about 400 feet per second developing centrifugal forces at the root ends of the blades thereof and developing substantial change in density and pressure in said fluid flowing between said blades, said wheel including axially spaced front and rear sheet metal walls, radially extending walls defining a socket means with an opening facing in the general radial direction, said socket walls extending between said front and rear walls and being bonded thereto along an area thereof of substanial radial and peripheral extent, a plurality of axial flow blades peripherally spaced about said wheel and conforming at said tips closely to said case, said blades being positioned between said radially extending walls of said socket means and positively secured thereto, a rim wall supported in said wheel adjacent the root ends of said blades, said blades in cooperation with said rim wall and case defining fluid compressing passages between said blades having inlets and exits with said exits being greater in cross sectional area than the corresponding said inlets to discharge said fluid with increased pressure, each said exit facing rearward downstream in the general axial direction to discharge fluid rearwardly in the general direction of said axis, said blades having faired leading edges and relatively sharp trailing edges extending in the general radial direction for efficient operation in providing said increased pressure, said rim wall extending between blades and from front to rear thereof to sustain said increased pressure, and a sheet metal disk secured to said front and rear walls and to said socket means at localities inwardly of said rim wall and adjacent thereto for sustaining said front and rear walls and socket means against centrifugal forces.

References Cited in the file of this patent

UNITED STATES PATENTS

| | | |
|---|---|---|
| 2,553,442 | Clark et al. | May 15, 1951 |
| 2,637,488 | Krouse et al. | May 5, 1953 |

FOREIGN PATENTS

| | | |
|---|---|---|
| 623,710 | Great Britain | May 20, 1949 |

UNITED STATES PATENT OFFICE
CERTIFICATE OF CORRECTION

Patent No. 2,867,407                                      January 6, 1959

Edward A. Stalker

It is hereby certified that error appears in the printed specification of the above numbered patent requiring correction and that the said Letters Patent should read as corrected below.

Column 1, line 18, for "pressing" read -- pressings --; column 6, line 41, after "socket" insert -- means --.

Signed and sealed this 16th day of June 1959.

(SEAL)
Attest:

KARL H. AXLINE                                            ROBERT C. WATSON
Attesting Officer                                       Commissioner of Patents